F. W. MERRICK.
LASTING MACHINE.
APPLICATION FILED SEPT. 25, 1916.
1,392,590.
Patented Oct. 4, 1921.
6 SHEETS—SHEET 5.
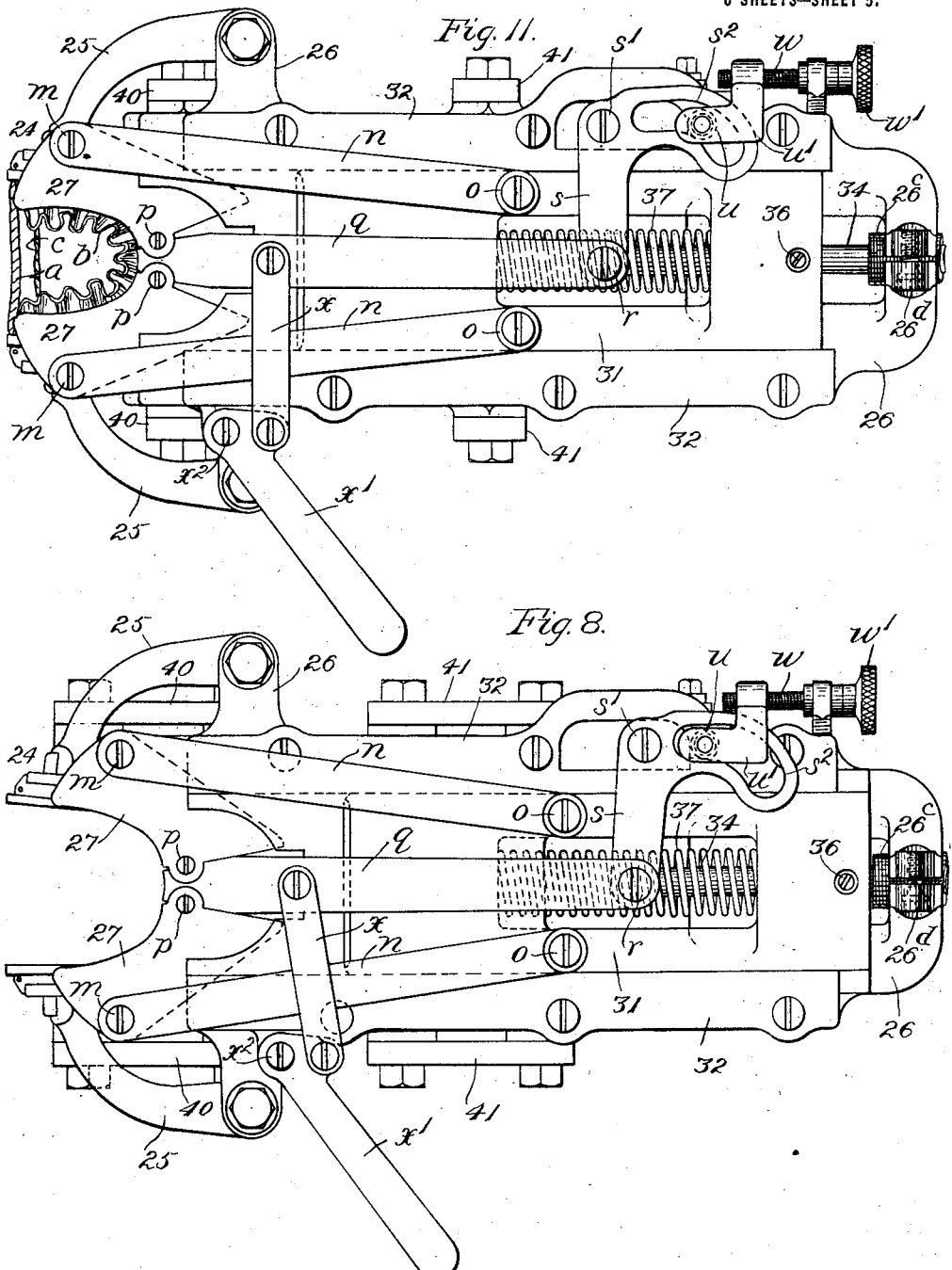
Witness:
Oscar F. Hill
Inventor:
Frank W. Merrick
by Chas. F. Randall
Attorney

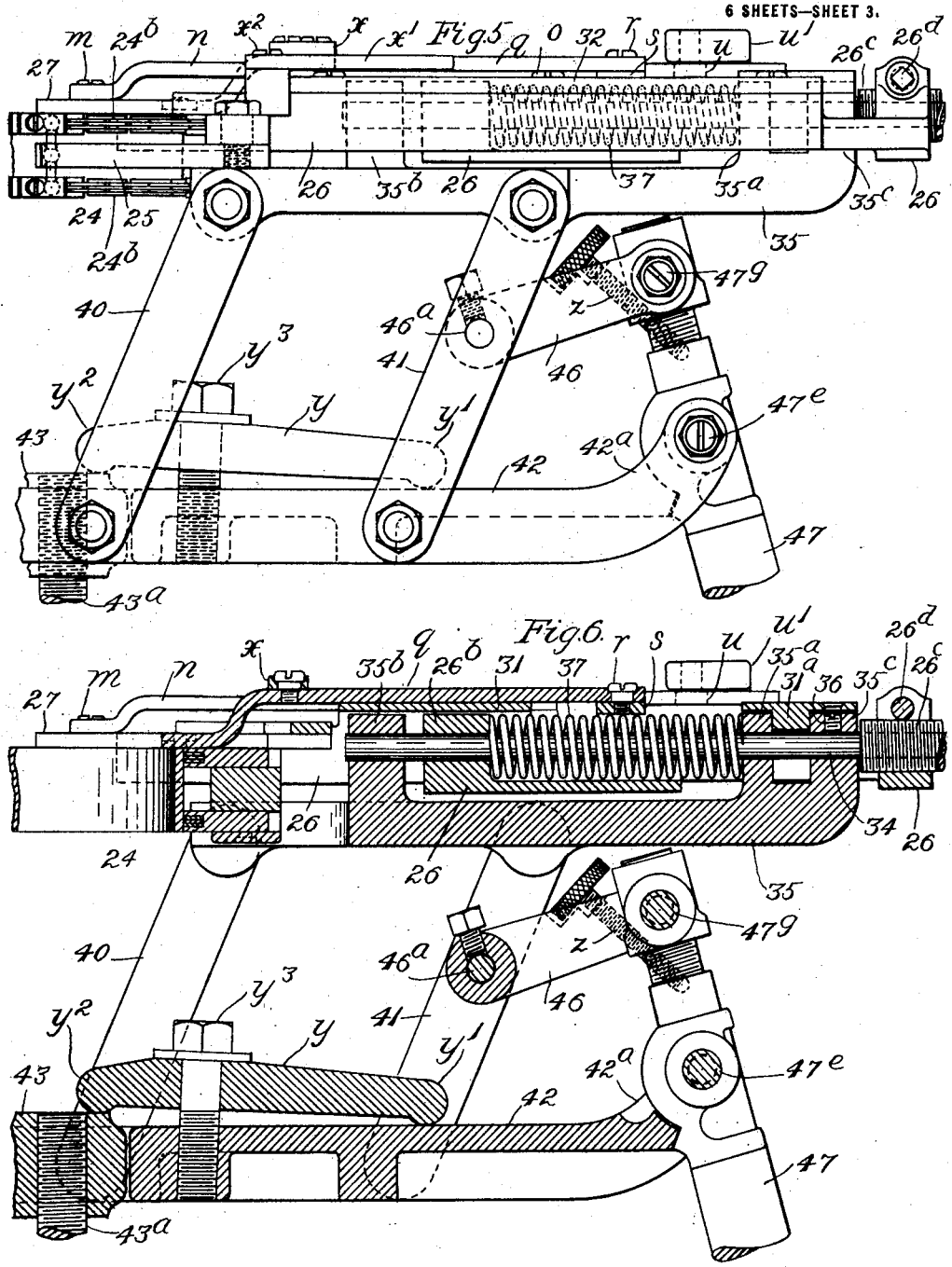

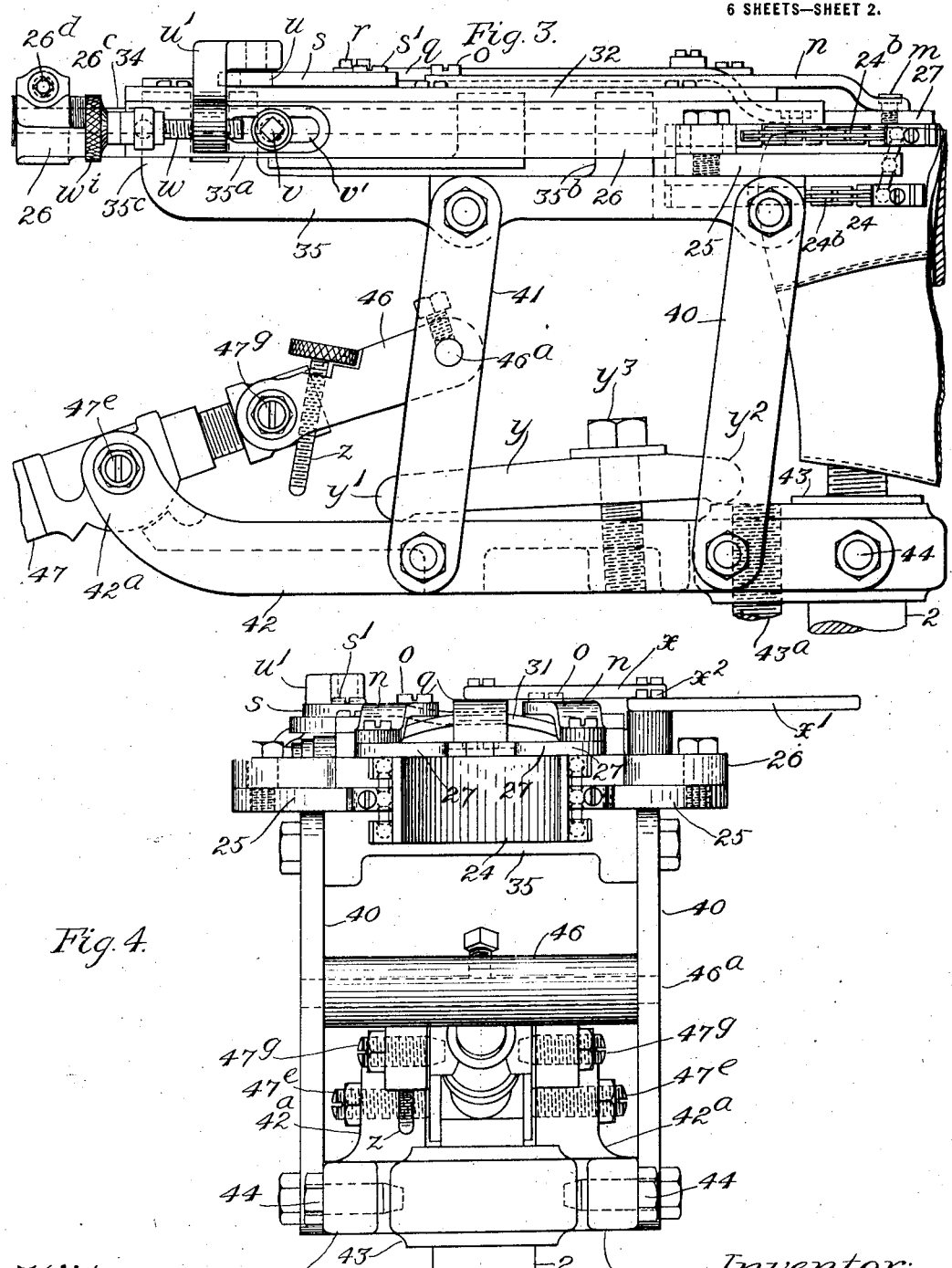

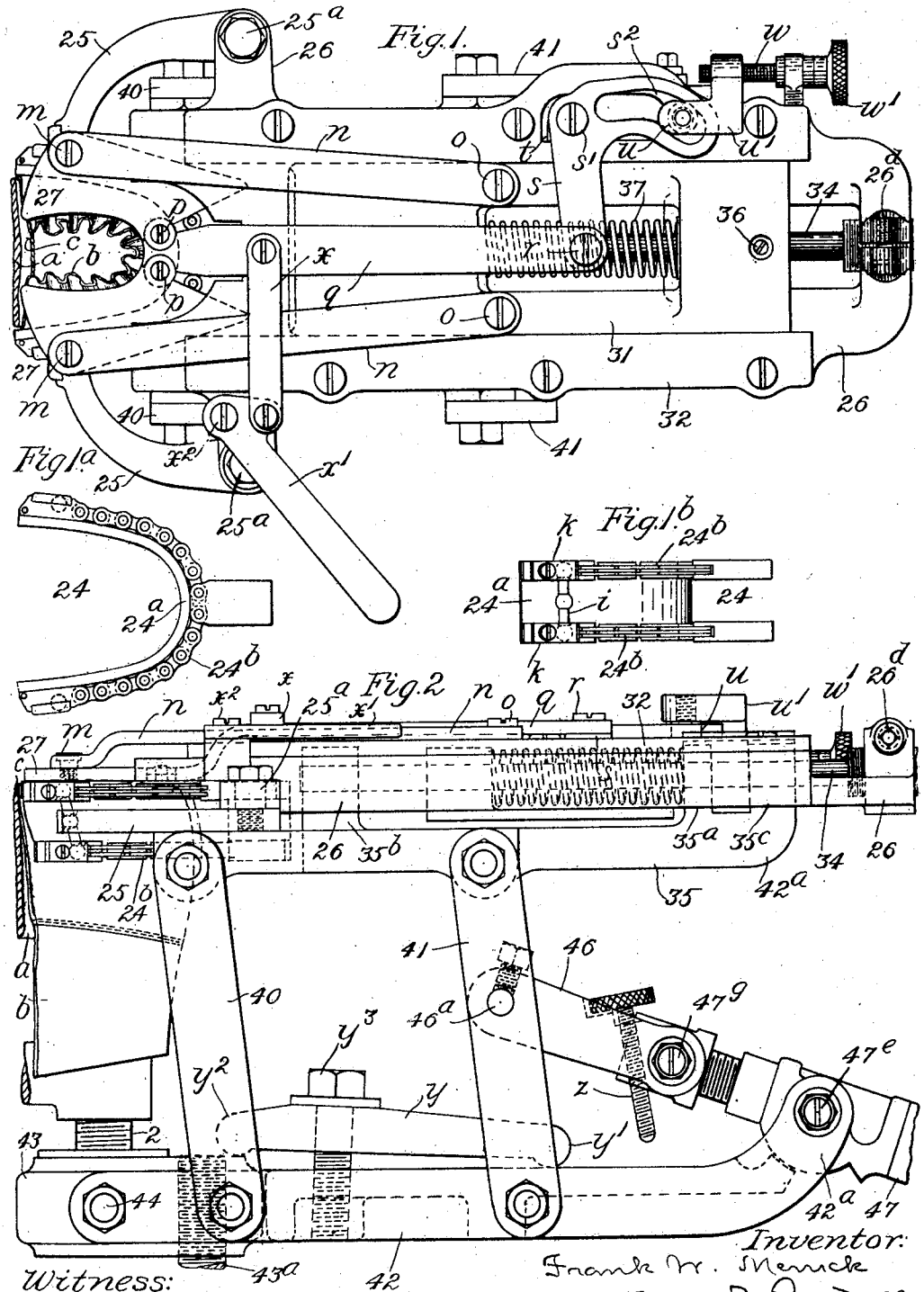

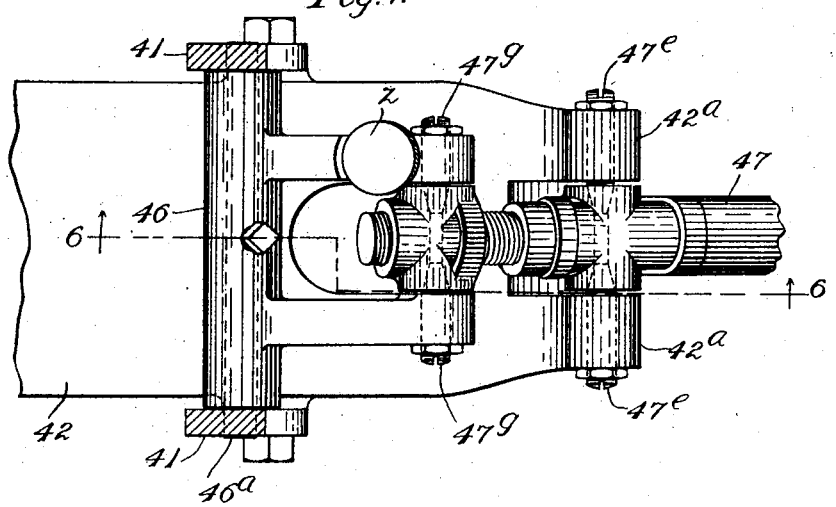

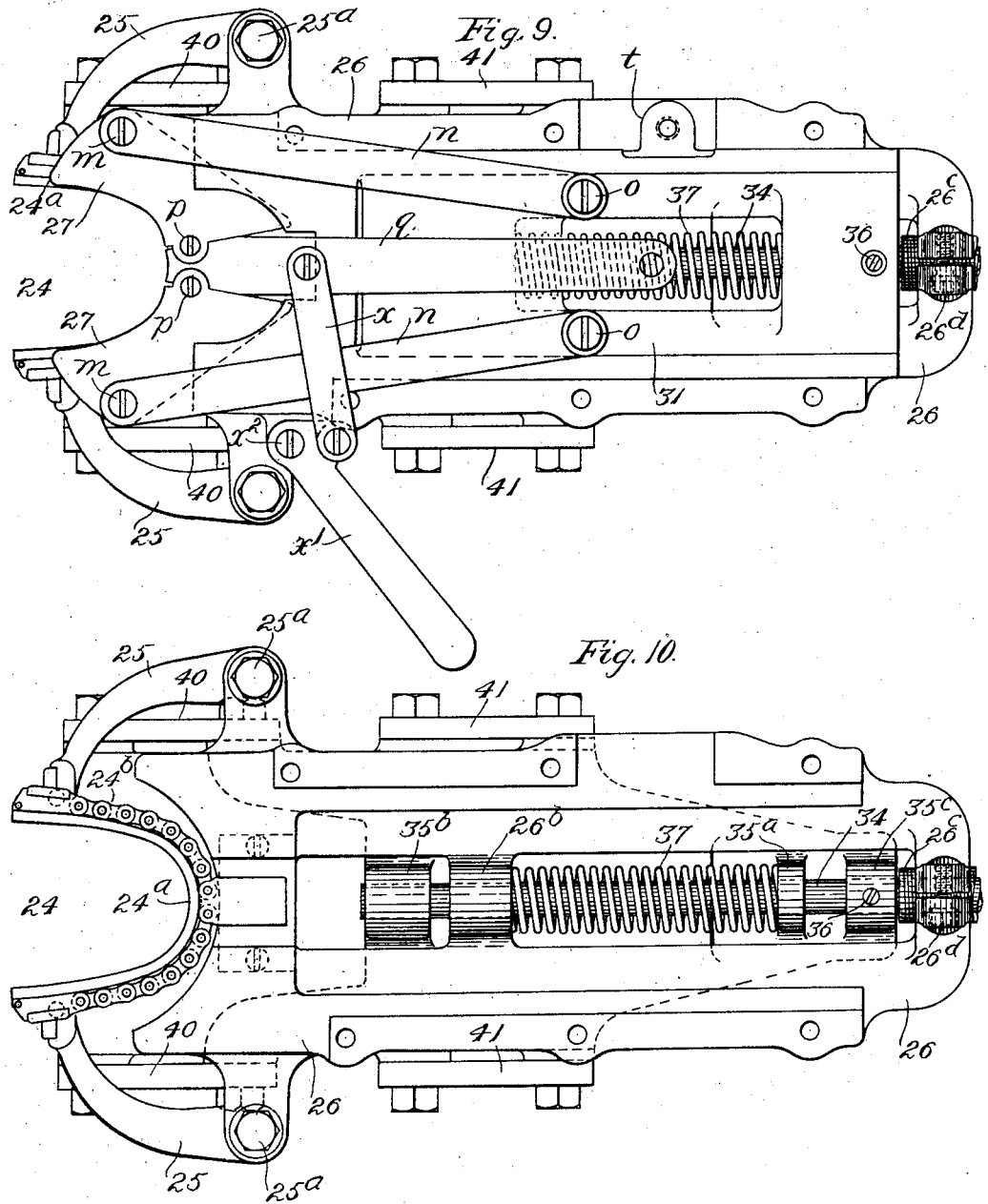

UNITED STATES PATENT OFFICE.

FRANK W. MERRICK, OF BOSTON, MASSACHUSETTS, ASSIGNOR TO UNION LOCK STITCH COMPANY, OF BOSTON, MASSACHUSETTS, A CORPORATION OF MAINE.

LASTING-MACHINE.

1,392,590.  Specification of Letters Patent.  Patented Oct. 4, 1921.

Application filed September 25, 1916. Serial No. 121,925.

*To all whom it may concern:*

Be it known that I, FRANK W. MERRICK, a citizen of the United States, residing at Boston, in the county of Suffolk, State of Massachusetts, have invented a certain new and useful Improvement in Lasting-Machines, of which the following is a specification, reference being had therein to the accompanying drawings.

The invention has relation to end-lasting mechanism, such for instance, as that of machines of the bed-lasting machine type.

The invention comprises an improved and novel means of mounting an end-band or compressor-band in connection with its supports. Also improved and novel end-wiper or crimping devices. Also, novel means of adjusting with reference to the horizontal the plane in which the end-wiper or crimping devices of an end-lasting mechanism operate. Also, a novel adjustment in connection with the toggle of the devices for actuating the end-lasting devices.

The features of the invention have been designed more particularly as improvements upon the lasting machine of my application for U. S. Letters Patent filed April 28, 1913, Serial No. 764,005, and in the drawings hereof I have shown the said features embodied in connection with certain of the parts of the said lasting machine. However, the said features are not necessarily restricted to employment in connection with the said lasting machine; nor are the principles of the invention restricted to embodiment in the precise form illustrated in the said drawings.

Having reference to the drawings,—

Figure 1 is a plan view of heel-lasting mechanism comprising an illustrative embodiment of the features of the invention, the said heel-lasting mechanism being of the type and general character of those of the application aforesaid. Portions of a last and of a lasted shoe are also shown in this view, with the end-band or compressor-band for the heel, and the wipers or crimpers, advanced and closed upon the said last and lasted shoe.

Figs. 1$^a$ and 1$^b$, respectively, are a plan view and a side elevation of the end-band or compressor-band of Fig. 1.

Fig. 2 is a side elevation of the parts which are shown in Fig. 1, in the same position as in the latter.

Fig. 3, Sheet 2, is another side elevation thereof, looking at the side opposite to that which is represented in Fig. 2.

Fig. 4, Sheet 2, is an end elevation of the parts of Figs. 1, 2 and 3, with the last and lasted shoe removed, looking at the mechanism from the inner end thereof.

Fig. 5, Sheet 3, is a side elevation, viewing the same side as in Fig. 2, with the lasting devices in their completely retracted position.

Fig. 6, Sheet 3, is a view in central longitudinal section, with the parts in the same position as in Fig. 5.

Fig. 7, Sheet 4, is a partial plan view, showing more particularly the toggle-arrangement.

Fig. 8, Sheet 5, is a plan view on the order of Fig. 1 but showing the lasting devices in their retracted position of Figs. 5 and 6.

Fig. 9, Sheet 6, is a plan view corresponding with Fig. 8, but with the gibs 32, 32, and certain of the parts by which the wipers or crimpers are actuated, removed.

Fig. 10, Sheet 6, is a plan view with the wiper or crimping devices removed.

Fig. 11, Sheet 5, is a plan view showing the parts positioned at an intermediate point in the horizontal movement of the devices.

Before describing and explaining the features of the invention, I will describe as briefly as possible those parts of the lasting machine of the application aforesaid in connection with which I have shown herein embodiments of the said features.

In the various views in which the last and parts of a shoe are shown, the last is marked $a$, the upper $b$, and the insole $c$, the last $a$ being shown mounted in connection with the upper end of a post 2.

The movable carriage on which the heel-band carrying plate or carrier 26 and the heel-wiper slide or carrier 31 are mounted is shown at 35.

The heel-band, *i.e.*, the end-band or compressor-band 24, is engaged at its opposite free ends with swinging supporting arms 25, 25 (see, more particularly, Fig. 10), which are mounted pivotally at 25$^a$, 25$^a$, upon lateral projections of the heel-band carrier 26. The said heel-band, as shown best in Figs. 1, 1$^a$, 1$^b$, and 2, comprises, essentially, a leather surfacing strip 24$^a$ and upper and lower chains 24$^b$, 24$^b$, which are attached to the back of the said strip. The improved and novel means of mounting the heel-band is described later herein.

The heel-wipers or crimping-plates 27, 27 (see, more particularly, Fig. 9), are combined operatively with the heel-wiper slide or carrier 31 in manner which is explained later herein, and also with the novel means for actuating them which is described hereinafter.

The heel-lasting devices are mounted with capacity to be swung or tipped transversely bodily at a lateral inclination suiting the twist of the last, upon a longitudinal pin 34, which pin is shown clearly in Fig. 6, and mounted in lugs $35^a$, $35^b$, $35^c$, rising from carriage 35 and entering openings in the plate 26. The said pin is held fixedly in the lug $35^c$ by means of a clamping screw 36. The plate 26 is mounted upon the said pin 34 by means of bearings at $26^b$, $26^c$ so that it is capable of being rocked or swung or tipped transversely thereon, as required.

The spiral-spring cushion 37 by which, when the carriage 35 is moved toward the heel-end of the last, the heel-band is pressed yieldingly against the heel-portion of the upper outside the counter of the shoe, and mounted on the pin 34 between one of the bearing portions, namely, $26^b$, of plate 26 and one of the lugs, namely $35^a$, of the carriage 35. Therefore, by reason of its expansibility it acts with the required tendency to hold the heel-band plate 26 longitudinally inward relative to the carriage 35 and to the heel-wiper slide or carrier 31, with the outer bearing, $26^c$, of carrier 26 in contact with lug $35^c$ of the carriage, as in Fig. 8. A certain amount of adjustment of the normal position of the heel-band inwardly with relation to the wipers or crimpers is provided for in the illustrated construction by making the guide-bearing $26^c$ adjustable lengthwise in connection with the heel-band carrier 26. This adjustability may be secured in various ways. In the illustrated construction it is secured by making the bearing $26^c$ with an external screw-thread and fitting it within a screw-threaded hole in the outer end-portion or cross-bar of the heel-band carrier 26. In order to prevent accidental loss of adjustment, the said end-portion or cross-bar is slitted through one side of the said hole, and is furnished with a tightening screw $26^d$ by means of which the two sides of the hole may be drawn together so as to clamp the guide-bearing $26^c$ in a manner to prevent accidental movement thereof. In the ingoing movement of the carriage 35 the spring 37 transmits pressure from the lug $35^a$ to the heel-band carrier 26, so that said carrier 26 moves in unison with said carriage until the heel-band brings up firmly around the heel-portions of the upper and last outside the counter of the shoe, and then the spring compresses during the remainder of the inward movement of the carriage, as to the extent indicated in Fig. 1, its tension continuing to hold the heel-band in close engagement with the heel-portions of the upper and last.

The upstanding lugs $35^a$ and $35^c$ of the carriage 35 also serve to actuate the heel-wiper carrier 31 in a positive manner. To this end a downwardly-projecting transverse portion $31^a$, Fig. 6, of the said heel-band carrier 31 is entered between the said lugs, and by the engagement of the lugs with the said portion $31^a$ the heel-band carrier 31 is caused to accompany the carriage 35 in the longitudinal movements of the latter. By reason of the positive actuation of the wiper-slide by the carriage 35, the wiper-slide continues to move in unison with the carriage after the inward movement of the heel-band and heel-band-carrier has been arrested through the contact of the heel-band with the counter of the shoe. The manner and means of producing the required action of the wipers or crimpers 27, 27 through the longitudinal movements of the heel-band-carrier 31 is described and explained later herein in the description and explanation of the features of the invention.

The required capability of carriage 35 for inward and outward movement in the direction of the length of the last is secured by supporting the carriage 35 by means of parallel links 40, 41. These parallel links cause the carriage 35 to remain parallel with its primary position throughout its back-and-forth movement. Adjustability of the carriage and its path of movement at an inclination or angle, to accommodate and suit the spring of the heel-portion of the last, is provided for, in general, by supporting the parallel links 40, 41, upon a mounting 42 which itself is supported in manner providing for adjustment by which the carriage 35 may be given a horizontal position and corresponding path of movement, or a position at any desired inclination longitudinally, and correspondingly inclined path of movement. In the present instance the mounting 42 is made U-shaped at its inner end, to extend on opposite sides of a sleeve 43 surrounding the post 2. The side-arms of the said end of the mounting are connected pivotally at 44, 44, with the said sleeve 43, so that the mounting 42 is capable of being swung vertically about its points of pivotal connection with the sleeve into either a horizontal position or one at an angle or inclination with relation to the horizontal. The means of adjusting the mounting into the required position with reference to the horizontal will be described and explained later herein in treating of the features of the invention. The adjustment of the mounting by means of the adjustment devices results in a corresponding adjustment of the carriage 35 and the heel-lasting devices. The parallel links 40, 41 insure movement of the lasting devices toward and from the last always in parallelism with the mounting, so that after the carriage has been adjusted into a horizontal or inclined position corresponding with the spring of the heel-portion of the last, the movement of the lasting device toward the last shall always cause such devices to act in a plane parallel to the general plane of the upper surface of the last and insole at and adjacent the heel.

The pivots connecting the parallel links 40, 41, with the mounting 42 and the carriage 35 are so related to the inward limit of the inward movement of the lasting devices that during the final portion of the wiping action, and after the margin of the upper has been wiped inward and crimped by the closed-together wipers or crimpers, the wipers or crimpers in approaching the positions in which they are shown in Figs. 1 and 2, shall move downward or descend more or less gradually upon the portions of said margins that are engaged thereby, so as to press such portions more forcibly and more directly against the bottom of the insole, thereby applying a gradually increasing pressure at the same time that they perform the regular wiping and crimping action. This produces a tendency to break down and set the leather snugly against the insole.

In the illustrated mechanism, for the actuation of the carriage 35, and associated heel-lasting devices, to move such parts longitudinally outward away from the last into the positions occupied by them in Figs. 5, 6 and 8, and inward again to perform the preliminary wiping operation, as well as to effect the final wiping and crimping action, the pair of parallel links 41, 41 is connected by a yoke-shaped connecting member or link 46 with the upper arm of a hand-lever 47 which is pivoted upon center screws $47^e$, $47^e$, between outward extensions $42^a$, $42^a$, of the mounting 42. Only a small portion of the power-arm of the said hand-lever is shown. By swinging movement of this hand-lever the workman is able to move the carriage 35 and heel-lasting devices inward to effect the said preliminary operation, and subsequently apply the requisite force to occasion the final wiping and crimping action and exert the direct pressure by which the wiped-over and crimped portion of the upper is broken down and set. The relative proportions or lengths of the link 46 and of the upper arm of the hand-lever 47, and the relations of the pivots $46^a$, $46^a$, connecting said link 46 to the links 41, 41; the pivots $47^g$, $47^g$, connecting said link to the upper arm of the hand-lever; and the pivots $47^e$, $47^e$, supporting the said hand-lever upon the mounting, to one another, are such that the link 46 and the upper arm of the hand-lever constitute toggle-members and operate with a toggle-action, and with progressively increasing power in moving the heel-lasting devices inward with relation to the heel of the last. The final portion of the swing of the hand-lever to occasion such inward movement carries the pivotal connection $47^g$, $47^g$, between the link 46 and the upper arm of the hand-lever into line with the pivotal connection $46^a$ of link 46 with links 41, 41, and with the pivotal connection $47^e$, $47^e$, of the hand-lever with the extensions or arms $42^a$, $42^a$, of the mounting 42 or slightly beyond the direct line, thus serving to exert the final powerful pressure and to lock the carriage in its inward position so as to maintain the pressure of the wipers upon the crimped-over portions of leather.

For the purpose of enabling the range of the inward movement of the heel-lasting devices to be varied at will, the length of the toggle-member constituted by the upper arm of the hand-lever 47 is made adjustable substantially as in the application aforesaid. As a feature of the present invention I have provided a means of determining the locking positions and relationship of the toggle-members, which is explained hereinafter in treating of the features of the invention.

The position of the heel-lasting devices is made adjustable vertically by vertical adjustment of the collar 43, which adjustment may be effected by means of a screw $43^a$ or any other approved means. Adjustment of the collar 43 either up or down, correspondingly raises or lowers bodily the mounting 42 and the entire assemblage of parts mounted thereon.

Referring now more particularly to the features of the invention:—

To permit the heel-band 24 to conform readily to the inclination of the curved exterior of the counter of the shoe that is being operated upon, the connection between the heel-band and the supporting arms 25, 25, is a flexible one. Thus, as shown best in Fig. $1^b$, to each end of the heel-band is applied a small bar $i$ having its upper and lower ends in ball-and-socket engagement with blocks $k$, $k$, with which the ends of the chains $24^b$, $24^b$, are connected, and the middle portion of its length in ball-and-socket engagement with the corresponding end of the corresponding supporting arm 25. There is, thus, a species of universal-joint connection between the swinging arm 25 and the bar $i$, and between the opposite ends of the bar $i$ and the terminal portions of the chains. This mode of connecting the heel-band with the opposite swinging arms 25, 25, gives complete flexibility and adaptability to the heel-band.

The lateral portions of the wipers or crimpers 27, 27, are connected by pivots $m$, $m$, with the inner ends of links $n$, $n$, while the outer ends of such links are connected by pivots $o$, $o$, to the wiper-slide 31, so that the movement of the wiper-slide serves to transmit movement through the said links to the wipers or crimpers. The outer portions of the wipers or crimpers are pivoted at $p$, $p$, to the inner end of a bar $q$, which at its outer end is connected by a pivot $r$ to a lateral arm of a bell-crank $s$ which is pivoted at $s'$ to an outwardly projecting lug $t$ (Fig. 9, Sheet 6) upon the wiper-slide 31. The outer arm of the bell-crank $s$ has formed therein a cam-slot $s^2$ in which is received a roll $u$ mounted on a fixed bracket $u'$ which is attached to the heel-band-carrier 26. See Fig. 3, Sheet 2. The said cam-slot $s^2$ has a straight portion that is parallel or substantially parallel with the guides in which the wiper-slide is mounted upon the heel-band-carrier. Consequently during the first part of the inward movement of the wiper-slide relative to the heel-band carrier after the inward movement of such carrier has been arrested through engagement of the heel-band with the upper and last, the bell-crank $s$ moves in unison with the wiper-slide without change in its angular position, and without any lengthwise movement of the bar $q$ relative to the wiper-slide, and consequently without any swiveling or swinging movement of the wipers or crimpers about their pivots $p$, $p$. As the inward movement of the wiper-slide relative to the heel-band carrier continues after the bend of the cam-slot has been presented at the roll (now stationary) $u$, the action of the roll against the inclined outer wall of the cam-slot causes the bell-crank to turn around its pivot $s'$ so as to hold the bar $q$ practically stationary while the wiper-slide and the links $n$, $n$, continue their inward movement. The effect of this is to cause the wipers or crimpers to swing inward around their pivots $p$, $p$. In operation, the fully open wipers or crimpers first move lengthwise of the last against the margin of the upper, and bend or break the same over the heel-seat, and then when the wipers or crimpers have passed to the required extent over the back part of the upper and heel-seat the swinging movement of the wipers or crimpers toward each other by which the margin of the upper at opposite sides of the heel is wiped inward is caused to take place.

Roll $u$ is made adjustable to enable the swinging movement of the wipers or crimpers toward each other to be caused to begin earlier or later in the inward movement of the wiper-slide relative to the heel-band carrier, as may be desired. To this end the bracket $u'$ made fast to one edge of the heel-band-carrier 26 by means of a clamping-screw $v$, Fig. 3, the stem of which occupies a slot $v'$ in the foot of the bracket $u'$ extending lengthwise of such foot, as shown in Fig. 3. For convenience in making the adjustment an adjusting-screw $w$ with milled head $w'$ is combined with the heel-band-carrier 26 and engaged with the bracket $u'$.

The adjustment of the roll $u$ by means of which the bell-crank $s$ is operated serves to vary the moment at which the converging sidewise closing action of the wipers or crimpers takes place, and also enables the extent of the closing-in movement to be varied to suit the width of the margins of the upper. It determines what proportion of the forward movement of the wiper-slide shall act in conjunction with the side wise closing.

In order to enable the workman to shift the wipers or crimpers from one side to the other so that any desired lateral adjustment of the wipers or crimpers with reference to the center line or sides of the last may be caused to take place, or so that greater or increased wiping action at one side or the other may be caused to take place, or so that the wiping action against one side may be repeated, bar $q$ is connected by means of a link $x$ with a hand-lever $x'$ which is pivoted at $x^2$ upon an ear of the wiper-slide 31. By means of this hand-lever the workman may shift bar $q$ and with it the wipers or crimpers transversely in one direction or the other as may be desired. As the hand-lever $x'$ is moved for the purposes of this adjustment or shift, the bar $q$ is swung about its pivotal connection $r$ with the bell-crank $s$ and the links $n$, $n$, are swung about their points of pivotal connection $o$, $o$, with the wiper-slide 31. The hand-lever $x'$ serves in addition as a convenient means of rocking the lasting devices transversely about the longitudinal axis thereof so that greater pressure may be applied by means of one of the wipers at one side of the longitudinal axis of the last than at the other, this action supplementing the transverse adjustment and the repetition of the wiping action when such repetition is caused to take place. The two adjustments of the wipers enables one side or the other to be favored, as may be desired in effecting the wiping.

The portion of the invention which relates to the means of adjusting with reference to the horizontal the plane in which the end-wiper or crimping devices operate, consists in adjusting means for such purpose, so combined with the mounting 42 and its support, the latter constituted herein by collar 43, that vertical shift or adjustment of the said support and the assemblage of devices supported therefrom, to bring the path of movement of the wipers or crimping devices into proper relation to the upper surface of the insole, does not affect the angle or inclination of the mounting 42. In accordance with the present invention an adjustment device is combined directly with the said mounting and collar, by being applied to one thereof and arranged to engage with the other. In the present instance, the said adjustment device comprises a lever $y$, which rests by its outer extremity $y'$ upon the top of the mounting 42 and by its inner extremity $y^2$ upon the top of a lateral portion of the collar 42. The bearing-point on the top of the collar is a little higher than the bearing-point on the mounting in this instance, and the lever is engaged by an adjustment-screw $y^3$ having its threaded stem screwed into a threaded hole that is tapped in the mounting. This lever and screw serve to support the outstanding portion of the mounting at the desired height, and at the desired angle with respect to the vertical. By turning the screw in one direction or the other so as to vary the relationship of the inner extremity $y^2$ of the lever $y$ with relation to the mounting, the outstanding portion of the mounting is raised or lowered, so that the mounting as a whole assumes the desired relation to the horizontal. The adjustment device that has just been described constitutes in effect a lever-like brace that is carried by the mounting, with its inner end resting upon the collar to which the mounting is pivoted. The lever and screw together serve as a means of adjustment by which the mounting and the lasting devices supported thereon may be adjusted to cause the wipers to work in a plane bearing the desired relation of parallelism with the surface of the insole at the heel-seat. The novel adjustment in connection with the toggle of the devices for actuating the end-lasting devices consists in an adjustable stop device by means of which a partial reverse movement of the wipers or crimpers for the purpose of enabling tacks or other fastening devices to be applied may be limited in extent. The said stop device is constituted in the present instance by a stop-screw $z$ shown applied to the link 46, it being fitted to a threaded hole in one side arm of the link 46 and having a milled head by means of which it may be turned conveniently by hand. In operation, the straightening of the toggle causes the wipers or crimpers to perform the wiping and crimping operation. Continued movement of the toggle-members past their straight-line position and operating to bend or break the toggle slightly will have the effect of reversely moving the wipers or crimpers so as to partially withdraw them and thereby afford access to the parts of the shoe to facilitate the operation of applying fastenings such as have been mentioned. The extent to which the movement of the toggle-members in thus opening or breaking the toggle may be continued is limited or determined through the contact of the tip end of the screw $z$ with the top of the mounting 42. By adjustment of the screw $z$ the extent of the movement of partial withdrawal may be varied to meet requirements.

What is claimed as the invention is:—

1. In a lasting machine, in combination, an end-band or compressor-band, opposite movable lateral supports therefor, and a bar at each end of the said band, said bar having its upper and lower portions in universal joint engagement with the corresponding end of the band and its middle in universal joint engagement with the corresponding support.

2. In a lasting machine, in combination, an end-band or compressor-band, opposite movable lateral supports therefor, and a bar at each end of the said band, said bar having its upper and lower portions in ball-and-socket engagement with the corresponding end of the band and its middle in ball-and-socket engagement with the corresponding support.

3. In a lasting machine, in combination, an end-band or compressor-band, opposite swinging supporting-arms, and a bar at each end of the said band, said bar having its upper and lower portions in ball-and-socket engagement with the corresponding end of the band and its middle in ball-and-socket engagement with the corresponding supporting arm.

4. In a lasting machine, in combination, a wiper-slide, wipers or crimpers, links respectively engaged by one end with one of the wipers or crimpers and by the other end with the wiper-slide, and coacting means connected also with the wipers or crimpers, coöperating to close and open the wipers or crimpers, and controlled irrespective of the shoe operated upon to effect the closing of the wipers or crimpers in the ingoing movement of the wiper-slide.

5. In a lasting machine, in combination, a wiper-slide, wipers or crimpers, links respectively engaged by one end with one of the wipers or crimpers and by the other end with the wiper-slide, and coacting means engaging with the intermediate portions of the wipers or crimpers coöperating in the movements of the wiper-slide to close and open the wipers or crimpers, and controlled irrespective of the shoe operated upon to effect the closing of the wipers or crimpers in the ingoing movement of the wiper-slide.

6. In a lasting machine, in combination, a wiper-slide, wipers or crimpers, links respectively engaged by one end with one of the wipers or crimpers and by the other end with the wiper-slide, a bar which engages with the tail-portions of the wipers or crimpers, and means controlling the said bar in the movements of the wiper-slide to bring about the closing and opening of the wipers or crimpers.

7. In a lasting machine, in combination, a wiper-slide, wipers or crimpers in swiveling connection with the wiper-slide, a bar connecting with the wipers or crimpers jointly, and means controlling the said bar in the movements of the wiper-slide to bring about the closing and opening of the wipers or crimpers.

8. In a lasting machine, in combination, a wiper-slide, wipers or crimpers in swiveling connection with the wiper-slide, a bar connecting with the wipers or crimpers jointly, and a cam-device controlling the said bar in the movements of the wiper-slide to bring about the closing and opening of the wipers or crimpers.

9. In a lasting machine, in combination, a wiper-slide, wipers or crimpers, links respectively connecting the wipers or crimpers with the wiper-slide, a bar connecting with the wipers or crimpers jointly, and a cam-device controlling the said bar in the movements of the wiper-slide to bring about the closing and opening of the wipers or crimpers.

10. In a lasting machine, in combination, a wiper-slide, wipers or crimpers in swiveling connection with the wiper-slide, a lever connecting with the wipers or crimpers jointly, and means controlling the said lever in the movements of the wiper-slide to bring about the closing and opening of the wipers or crimpers.

11. In a lasting machine, in combination, a wiper-slide, wipers or crimpers, links respectively connecting the wipers or crimpers with the wiper-slide, a lever connecting with the wipers or crimpers jointly, and means controlling the said lever in the movements of the wiper-slide to bring about the closing and opening of the wipers or crimpers.

12. In a lasting machine, in combination, a wiper-slide, wipers or crimpers in swiveling connection with the wiper-slide, a lever connecting with the wipers or crimpers jointly, and a cam-device controlling the said lever in the movements of the wiper-slide to bring about the closing and opening of the wipers or crimpers.

13. In a lasting machine, in combination, a wiper-slide, wipers or crimpers in swiveling connection with the wiper-slide, a bar connecting with the wipers or crimpers jointly, an actuating lever in connection with said bar, and means controlling said lever and bar in the movements of the wiper-slide to bring about the closing and opening of the wipers or crimpers.

14. In a lasting machine, in combination, a wiper-slide, wipers or crimpers in swiveling connection with the wiper-slide, a bar connecting with the wipers or crimpers jointly, an actuating lever in connection with said bar, and a cam-device controlling said lever and bar in the movements of the wiper-slide to bring about the closing and opening of the wipers or crimpers.

15. In a lasting machine, in combination, a wiper-slide, wipers or crimpers, links respectively connecting the wipers or crimpers with the wiper-slide, a bar connecting with the wipers or crimpers jointly, an actuating lever in connection with said bar, and means controlling said lever and bar in the movements of the wiper-slide to bring about the closing and opening of the wipers or crimpers.

16. In a lasting machine, in combination, a wiper-slide, wipers or crimpers, links respectively connecting the wipers or crimpers with the wiper-slide, a bar connecting with the wipers or crimpers jointly, an actuating lever in connection with said bar, and a cam-device controlling said lever and bar in the movements of the wiper-slide to bring about the closing and opening of the wipers or crimpers.

17. In a lasting machine, in combination, an end-band, an end-band carrier, a wiper-slide, wipers or crimpers in swiveling connection with the wiper-slide, a lever moving with the wiper-slide and connecting with the wipers or crimpers jointly, and a cam-device carried by the end-band carrier and coöperating with the lever, thereby controlling the opening and closing of the wipers or crimpers.

18. In a lasting machine, in combination, an end-band, an end-band carrier, a wiper-slide, wipers or crimpers in swiveling connection with the wiper-slide, a bar connecting with the wipers or crimpers jointly, a lever moving with the wiper-slide, and a cam-device carried by the end-band carrier and coöperating with the lever to control the bar and through the latter bring about the closing and opening of the wipers or crimpers.

19. In a lasting machine, in combination, an end-band, an end-band carrier, a wiper-slide, wipers or crimpers, links loosely connecting the wipers or crimpers respectively with the wiper-slide, a bar connecting with the wipers or crimpers jointly, a lever moving with the wiper-slide, and a cam-device carried by the end-band carrier and coöperating with the lever to control the bar and through the later bring about the closing and opening of the wipers or crimpers.

20. In a lasting machine, in combination, an end-band, an end-band carrier, a wiper-slide, wipers or crimpers in swiveling connection with the wiper-slide, a cam-slotted lever moving with the wiper-slide and connecting with the wipers or crimpers jointly, and a member moving with the end-band-carrier and working in the cam-slot of the lever to control the wipers or crimpers through the lever.

21. In a lasting machine, in combination, an end-band, an end-band carrier, a wiper-slide, wipers or crimpers in swiveling connection with the wiper-slide, a bar connecting with the wipers or crimpers jointly, a cam-slotted lever moving with the wiper-slide and connecting with the said bar, and a member moving with the end-band carrier and working in the cam-slot of the lever to control the wipers or crimpers through the lever and bar.

22. In a lasting machine, in combination, an end-band, an end-band carrier, a wiper-slide, wipers or crimpers, links loosely connecting the wipers or crimpers respectively with the wiper-slide, a bar connecting with the wipers or crimpers jointly, a cam-slotted lever moving with the wiper-slide and connecting with the said bar, and a member moving with the end-band carrier and working in the cam-slot of the lever to control the wipers or crimpers through the lever and bar.

23. In a lasting machine, in combination, a wiper-slide, wipers or crimpers, links connecting the respective wipers or crimpers with the wiper-slide, a bar to which the wipers or crimpers jointly are connected, means acting through such bar to control the closing and opening of the wipers or crimpers, and adjustment-means through which the bar and wipers or crimpers may be adjusted transversely.

24. In a lasting machine, in combination, a wiper-slide, wipers or crimpers, links connecting the respective wipers or crimpers with the wiper-slide, a bar to which the wipers or crimpers jointly are connected, means acting through such bar to control the closing and opening of the wipers or crimpers, and a handle through which the bar and wipers or crimpers may be adjusted transversely.

25. In a lasting machine, in combination, a wiper-slide, wipers or crimpers, links connecting the respective wipers or crimpers with the wiper-slide, a bar to which the wipers or crimpers jointly are connected, means acting through such bar to control the closing and opening of the wipers or crimpers, and a manually-operable lever linked to the said bar, through which the bar and wipers or crimpers may be shifted transversely.

26. In a lasting machine, in combination, a wiper-slide, wipers or crimpers, links connecting the respective wipers or crimpers with the wiper-slide, a bar to which the wipers or crimpers jointly are connected, an actuating lever for said bar, means acting through said lever and bar in the movements of the wiper-slide to control the closing and opening of the wipers or crimpers, and a manually-operable lever operatively connected with the bar, through which the bar and wipers or crimpers may be shifted transversely.

27. In a lasting machine, in combination, a wiper-slide mounted with capacity to rock or swing transversely, wipers or crimpers in swiveling connection with the wiper-slide, a bar to which the wipers or crimpers jointly are connected also, means acting through said bar in the movements of the wiper-slide to control the closing and opening of the wipers or crimpers, and a manually-operable handle operatively connected with the bar, and through which the bar and wipers or crimpers may be shifted transversely, and also the wiper-slide rocked to suit the twist of the last.

28. In a lasting machine, in combination, lasting devices including wipers or crimpers, an actuating toggle for said devices, and a stop for arresting the bending of the toggle past centers with the wipers or crimpers partly withdrawn.

29. In a lasting machine, in combination, lasting devices including wipers or crimpers, an actuating toggle for said devices, and an adjustable stop for arresting the bending of the toggle past centers with the wipers or crimpers partly withdrawn.

In testimony whereof I affix my signature in presence of two witnesses.

FRANK W. MERRICK.

Witnesses:
   CHAS. F. RANDALL,
   ELLEN O. SPRING.